United States Patent [19]

Delbouille et al.

[11] 3,883,492
[45] May 13, 1975

[54] PROCESS FOR THE POLYMERIZATION AND COPOLYMERIZATION OF OLEFINS

[75] Inventors: Andre Delbouille; Jean-Louis Derroitte, both of Brussels, Belgium

[73] Assignee: Solvay & Cie, Brussels, Belgium

[22] Filed: Jan. 13, 1969

[21] Appl. No.: 790,832

[30] Foreign Application Priority Data
Jan. 17, 1968  France .......................... 68.136374

[52] U.S. Cl.......... 260/88.2 R; 252/429 C; 252/441; 252/461; 252/467; 252/468; 252/469; 252/470; 252/471; 252/473; 252/474; 252/475; 252/476; 260/93.7; 260/94.9 DA
[51] Int. Cl. .......................... C08f 1/56; B01j 11/84
[58] Field of Search ....... 252/429; 260/88.2, 94.9 E, 260/93.7

[56] References Cited
UNITED STATES PATENTS

| | | | |
|---|---|---|---|
| 3,166,542 | 1/1965 | Orzechowski et al. ...... | 260/94.9 DA |
| 3,400,110 | 9/1968 | Dassesse et al. .................... | 260/94.9 |
| 3,759,884 | 9/1973 | Tokuzumi et al. .......... | 260/94.9 DA |

OTHER PUBLICATIONS
Anderson et al., Trans. Faraday Soc., Vol. 58, (1962), pp. 1993–2004.

*Primary Examiner*—Edward J. Smith

[57] ABSTRACT

Polymerization and copolymerization of olefins are carried out in the presence of a catalyst obtained by reacting in the liquid phase a transition metal compound with a solid support comprised of a divalent metallic hydroxide and then activating the resulting complex with an organometallic compound.

19 Claims, No Drawings

PROCESS FOR THE POLYMERIZATION AND COPOLYMERIZATION OF OLEFINS

BACKGROUND OF THE INVENTION

The present invention is directed to a process for the polymerization and the copolymerization of olefins, particularly ethylene in the presence of solid catalysts.

In Belgian Pat. No. 650,679, there has been described a process for the polymerization and the copolymerization of olefins in the presence of a catalyst obtained by activating with an organometallic compound, the product resulting from the reaction between a compound of a transition metal and a solid compound comprising a divalent metal hydroxychloride. This last named compound is preferably magnesium hydroxychloride, having the formula Mg(OH)Cl.

Though it is not yet an established fact, it is believed that the reaction between the transition metal compound and the divalent metal hydroxychloride which produces the catalysts described in the above Belgian patent involves chemical bonding by means of the —OH groups of the hydroxychloride.

The catalytic complex comprises the following elements:

a divalent metal M, preferably magnesium chlorine a transition metal M' bonded to the divalent metal by means of oxygen reactive groups X bonded to the transition metal.

Catalytic polymerizations carried out with the above catalytic complexes and described in the above Belgian patent, have certain disadvantages. In particular, the use of hydroxychlorides as divalent metal compounds is required. These compounds, which are not commercially available are very costly and are difficult to prepare. Furthermore, they are relatively unstable and can be dissociated to produce hydrogen chloride, according to the following reaction:

$$M(OH)Cl \rightarrow MO + HCl \qquad (2)$$

SUMMARY OF THE INVENTION

We have now discovered a method for preparing catalytic complexes and catalysts having the advantages of the catalysts derived from hydroxychlorides, but which are free of their disadvantages.

The process according to the invention comprises carrying out the polymerization and the copolymerization of olefins in the presence of a catalyst comprising an organometallic compound and the product resulting from the reaction carried out in liquid phase with the avoidance of overheating, of a derivative of a transition metal compound and an anhydrous solid support comprising a hydroxide of the formula $M(OH)_2$, in which M is a metal which may be divalent.

DESCRIPTION OF THE PREFERRED EMBODIMENTS

It has been discovered that by mixing a derivative of transition metal with a hydroxide of a divalent metal, chemical reactions occur which produce catalytic complexes having similar properties to those of catalytic complexes obtained by reaction of the same transition metal derivative and a hydroxychloride of the same metal.

One of the advantages resulting from the preparation of the catalyst according to the present invention is the production of catalysts in which the chlorine content is very low. It is not possible to obtain the present catalyst having a low chlorine content by using hydroxychlorides, In the catalytic complexes obtained from hydroxychlorides, the amount of chlorine is very high, e.g. about 460 g./kg. in the case of Mg(OH)Cl, the atomic ratio of Cl/divalent metal is generally very close to or slightly higher than 1 and the atomic ratio of Cl/transition element is comprised between 100 and 300.

According to the present invention, these ratios and the chlorine content of the catalytic complexes are reduced in substantial proportions; extremely active catalysts are obtained in which the halogen/divalent metal ratio is lower than 0.2 while the halogen/transition element ratio remains higher than 4. The amount of chlorine in these catalysts does does not exceed 100 g./kg., which is highly advantageous since the low chlorine content is a guarantee of a perfect stability.

Hitherto, the presence of even a small amount of catalyst in the polymer product has been considered undesirable due to the possible degradation of the catalyst according to equation 2, since the catalyst degradation product, hydrogen chloride corrodes and degrades the polymer. The quantity of halogen in the catalyst of the present invention is sufficiently low to be considered negligible, and there is no risk of corrosion or degradation of the resulting polymer by the action of hydrogen chloride which may be split off.

Since the structures of the new active complexes are similar to the structures of the complexes derived from hydroxychloride, it is believed that the bonding of the transition metal to the support is carried out through the medium of oxygen.

The compound used as the support of the reaction is a hydroxide of the formula $M(OH)_2$, in which M may be divalent. It may be selected from the group comprising the hydroxides of the formula $Mg(OH)_2$, $Ca(OH)_2$, $Cr(OH)_2$, $Mn(OH)_2$, $Ni(OH)_2$, $Co(OH)_2$, $Fe(OH)_2$ $Cu(OH)_2$, $Zn(OH)_2$ and $Cd(OH)_2$. Preferably, the hydroxides of magnesium, calcium, manganese and cobalt are used.

It has been realized that the presence of free water is detrimental to the preparation of catalysts having desirable properties. For this reason, the supports are carefully dried before being used. Drying is generally carried out under such conditions that there is no dehydration of the hydroxide, for example, by heating in vacuum under moderate temperature for a sufficiently long period of time. However, a slight dehydration of the hydroxide is not necessarily harmful to the properties of the support.

The granulometry of the support is not critical and has no influence on the outcome of the bonding reaction. However, as the granulometry has a serious effect on the aspect and the granulometry of the polymer, it is preferred to use supports in which the granulometry is high enough and in which the average diameter of the particles is higher than 10 microns.

The transition metal derivatives which can be used for the preparation of the polymerization catalysts are selected from the derivatives of the metals of Groups IVb, Vb and VIb of the Periodic Table, particularly, from the halides, oxyhalides, alkoxyhalides, oxyalkoxides and alkoxides of these metals and especially the just mentioned derivatives of titanium, vanadium and chromium. Preferably, under the reaction conditions, liquid derivatives are used, such as $TiCl_4$, $TiCl_2(OC_2H_5)_2$, $Ti(OC_4H_9)_4$, $VCl_4$, $VOCl_3$, $VO(OC_4H_9)_3$ and $CrO_2Cl_2$.

The reaction between the derivative of a transition metal and the hydroxide support should be carried out in the absence of moisture.

Preferably, the reaction is carried out in the absence of solvent, by merely suspending the hydroxide in the transition metal derivative which is used practically pure and maintained liquid, in order to prevent precipitation of the products resulting from hydrolysis which have only little activity and are not desirable during the polymerization.

However, the reaction between highly hydroxylated derivatives, such as the hydroxides, and some specific transition metal derivatives, in particular the halides and oxyhalides, may be highly exothermic. Overheating of the reaction mixture may lead to a solidification of the reactants and, in every case, to inactive catalysts. For this reason, the reaction is carried out under conditions which prevent any overheating of the reaction mixture. Generalized overheating may be avoided by the use of a relatively large quantity of liquid; however, local overheating at the surface of the solid causes lumping and solidification thereof which should be prevented. It is preferable, therefore, to mix the hydroxide with the halide initially at a temperature of about 10° to 40°C., most preferably at ambient temperature with violent stirring. In addition, the liquid phase, pure halide, or solvent and halide, should be present in large excess in the reaction medium; the weight ratio of liquid to solid should be preferably comprised between 50:1 and 3:1 more advantageously from 20:1 to 4:1.

Other expedients may also be taken to avoid localized overheating. For example, a stream of the cooled transition metal derivative may be circulated on the support, at such a speed that even localized overheating is avoided. It is also possible to allow the powdered support to fall as a mist in a large quantity of the cold transition metal derivative.

The suspension is then heated to the desired temperature, generally between 40° and 180°C., in order to complete the reaction. It is preferable to increase the temperature slowly. For example, the heating speed may be of the order of 1°C. per minute.

After the bonding reaction, the resulting solid catalyst, may be extracted by means of the transition metal derivative itself, which is heated up to a temperature of 40° to 180°C.

A certain quantity of the transition metal derivative then becomes bonded to the hydroxide to form the catalyst support, and it cannot be eliminated merely by physical means. It has been found that a certain quantity of the transition metal compound is not eliminated when washing with a hydrocarbon solvent after the bonding reaction.

After the washing step, the resulting catalyst must be activated by contacting it with an organometallic derivative of a metal of Groups I, II, III or IV of the Periodic Table. As used herein, the term organometallic compounds includes organosilicon compounds in accordance with the usage in *Organometallic Chemistry - Selected Topics in Modern Chemistry* by E. G. Rochow, Reinhold Publishing Corp., 1964 and *The Chemistry of Organometallic Compounds*, by E. G. Rochow, D. T. Hurd and R. N. Lewis, John Wiley and Sons, 1957. Organometallic halides and hydrides and completely alkylated derivatives thereof, such as dialkylaluminum halides, alkylmagnesium halides, alkylaluminum hydrides, alkyltin hydrides, and organic compounds of silicon having at least one Si-H bond may be used as activators, wherein trialkyl aluminum compounds are preferred. As examples of such activators triethylaluminum, triisobutylaluminum, tri-n-octylaluminum, diethylaluminum chloride, ethylmagnesium bromide, diisobutylaluminum hydride, tri-n-butyltin hydride, triethylsilane, methyl hydrogen silicone oil may be mentioned.

The amount of activator is not critical as long as there is a molar excess thereof with respect to the amount of transition metal bonded on the support. The activator/bonded transition metal molar ratio is preferably comprised between 10 and 50.

The activation may be carried out immediately before the introduction of the monomers; it is also possible to allow the catalyst to age at room temperature or higher for a more or less extended period of time.

The process according to the invention may be used for the polymerization and the copolymerization of olefins, such as for the production of polyethylene, polypropylene and copolymers of ethylene and propylene.

When used for polymerizing ethylene, the catalyst according to the invention will produce, with extremely high activities, a polyethylene having exceptional properties. For example, this polyethylene possesses such as linearity that it contains less than one $CH_3$ group per 1,000 carbon atoms. There are no traces of trans-internal unsaturation and only 0.01 to 0.2 vinyl double bonds, and 0.01 to 0.1 vinylidene double bonds per 1,000 carbon atoms are present. The specific weight of this product is equal to or higher than 0.968 g./cm.$^3$, which makes it particularly interesting for applications in injection molding.

Besides the above properties which are common to a certain number of catalysts chemically bonded to the supports, the catalyst according to the present invention have some particularly advantageous specific characteristics.

For example, they are suitable for the production of low and even very low molecular weight polyethylenes without requiring very high partial pressures of hydrogen.

On the other hand, these catalysts are much less sensitive than most of the known catalysts, to the poisoning agents of the polymerization catalysts, particularly water and oxygen.

Finally, because of the high stability, the transition element compounds content and the extremely high activity of these new catalysts, a low quantity of inert and nonharmful residues can be found in the product coming out of the polymerization reactor. For this reason, it is not required to purify this product, and consequently it can be used as such. The use of the new catalyst according to the present invention therefore leads to a very important simplification of the polymerization apparatus and to a corresponding reduction of the cost of the product.

Finally, the copolymers of ethylene and propylene produced by the process according to the invention have a particularly high propylene content; they are characterized by an amorphous structure and very good elastomeric properties.

The polymerization and the copolymerization may be carried out according to known methods: in a gaseous phase, in the absence of a liquid medium solvent of the monomer or in the presence of a dispersing medium in which the monomer is soluble. As liquid dispersion medium, there may be used an inert hydrocarbon, which is liquid under the polymerization conditions, or the monomers themselves, which are maintained liquid under their pressure of saturation.

For the production of the elastomeric copolymers of ethylene and propylene, the catalyst according to the invention permit operation in suspension in the liquid monomers, to produce granulated products which can easily be handled. On the contrary, with most of the known catalysts obtained under these conditions, a rubbery compact mass is obtained which is difficult to handle; the reaction then has to be carried out in solution.

The following examples are given to further illustrate the scope of the invention and the best mode contemplated for carrying it out; but the examples must not be construed as restricting the invention.

EXAMPLE 1

Pure magnesium hydroxide used in analysis is dried at 270°C. for 20 hours under a stream of dry nitrogen.

12.33 g. of dried magnesium hydroxide are allowed to fall in powder form into 50 ml. of pure $TiCl_4$ at room temperature and the mixture is heated to 130°C. while stirring for 1 hour; then the solid product is transferred into the basket of a Kumagawa type extractor and the extraction is carried out for 1 hour with boiling $TiCl_4$. Washing is carried out with hexane until elimination of all traces of $TiCl_4$ which are not chemically bonded and also of all traces of chloride in the washing solvent.

The resulting product was analyzed. It contained per kg.:

384 g. of magnesium
100 g. of chlorine
3.7 g. of titanium.

The chlorine/titanium atomic ratio of this product is 36.6 which indicates that besides the bonding of titanium, there is a reaction which produced a supplementary bonding of chlorine.

408 mg. of the solid catalyst prepared in the above manner were suspended in 1 liter of hexane, in a 3 liter stainless steel autoclave. Then into this suspension, there were introduced 5 ml. of a solution containing 340 g./l. of triisobutylaluminum in hexane, which corresponds to an Al/Ti atomic ratio of 32. The temperature of the autoclave is then raised to 80°C. and there are then introduced therein ethylene and hydrogen. The partial pressures of these two gases are respectively 2 and 4 kg./cm.$^2$.

After a reaction period of 2 hours under a pressure which is maintained constant by the continuous addition of ethylene, the autoclave is freed from gases and 141 g. of polyethylene are removed, which corresponds to a catalytic activity of 23,400 g. polyethylene/h.g. .Ti.atm. $C_2H_4$.

The true specific weight of the above polyethylene is 0.968 g./cm.$^3$ and its melt index, determined according to ASTM norm D 1238-59 T is 3 g./10 min.

EXAMPLE 2

21 g. of $Ti(OC_2H_5)_2Cl_2$ as a 20% solution in heptane were introduced in a flask with 8 g. of pure $Mg(OH)_2$. The mixture is heated at 120°C. for 1 hour on an oil bath, washed with hexane while still warm until complete removal of chlorine from the washing solvent. There are obtained 19 g. of a solid catalyst containing 209 g. Ti/kg.

Using 0.107 g. of this solid catalyst and 1.0 g. of triisobutylaluminum (Al/Ti = 10), a polymerization test is carried out at a temperature of 80°C. under a pressure of 12 kg./cm.$^2$ of $C_2H_4$. After a reaction period of 1 hour, there are obtained 196 g. of polyethylene, which corresponds to a catalytic activity of 720 g. of PE/h.g.Ti.atm.$C_2H_4$.

EXAMPLES 3 AND 4

Using the same apparatus as in Example 2, $VOCl_3$ and $CrO_2Cl_2$ are reacted with the same magnesium hydroxide. The reactions are carried out in solutions containing 20% by volume respectively in heptane at 110°C., and $CCl_4$ at 77°C.. The composition of the solid catalyst is given in the following Table I.

The tests were carried out according to the mode of operation described in Example 1. The specific conditions of each test and the results are given in Table 1.

TABLE 1

|  |  | Example 3 | Example 4 |
|---|---|---|---|
| Solid catalyst | | | |
| Content of bonded V | g./kg. | 59 | — |
| Bonded Cr | g./kg. | — | 26 |
| Quantity used in polymerization | g. | 0.290 | 1.487 |
| Activator | | | |
| Quantity used | g. | 1.0 | 1.5 |
| Atomic ratio Al/V or Cr | g. | 15 | 10 |
| Polymerization | | | |
| Partial pressure $C_2H_4$ | kg./cm.$^2$ | 20 | 20 |
| Partial pressure $H_2$ | kg./cm.$^2$ | — | — |
| Polymer | | | |
| Quantity obtained | g. | 21 | 28 |
| Catalytic activity          g. PE/h.g. V or Cr.atm.$C_2H_4$ | | 27 | 18 |

EXAMPLES 5 TO 8

By operating as described in Example 1, a series of hydroxides of formula $M(OH)_2$ are allowed to react with $TiCl_4$, then polymerization tests were carried out. The data concerning the operating conditions and the results of these tests are given in Table 2.

The catalytic activity is 780,000 g. of copolymer per hour and per g. of Ti and the productivity, expressed as g. of copolymer produced by g. of solid catalyst, is 1430. The amount of propylene in the resulting copolymer is 0.64 mole/mole copolymer and the intrinsic viscosity measured at 120°C. in xylene is 0.18 l/g.. The

TABLE 2

|  |  | Ex. 5 | Ex. 6 | Ex. 7 | Ex. 8 | Ex. 9 |
|---|---|---|---|---|---|---|
| Solid catalyst |  |  |  |  |  |  |
| Nature of hydroxide |  | $Ca(OH)_2$ | $Co(OH)_2$ | $Mn(OH)_2$ | $Fe(OH)_2$ | $Ni(OH)_2$ |
| Content of bonded Ti g./kg. |  | 1.0 | 4.9 | 0.7 | 76 | 61 |
| Content of bonded Cl g./kg. |  | 35.0 | 96.0 | 22 | 203 | 225 |
| Ratio Cl/Ti |  | 49 | 26 | 41 | 3.6 | 5 |
| Quantity used in polymerization | g. | 1.410 | 1.032 | 0.500 | 0.408 | 0.200 |
| Activator = |  |  |  |  |  |  |
| $Al(iC_4H_9)_3$ |  |  |  |  |  |  |
| Quantity used | g. | 0.2 | 0.2 | 0.2 | 1.0 | 1.0 |
| Ratio Al/Ti |  | 34 | 20 | 130 | 7.5 | 20 |
| Polymerization |  |  |  |  |  |  |
| Partial pressure $C_2H_4$ kg./cm.$^2$ |  | 2 | 4 | 4 | 4 | 20 |
| Partial pressure $H_2$ kg./cm.$^2$ |  | 4 | 8 | 8 | 8 | — |
| Duration | h. | 2 | 2 | 2 | 2 | 2 |
| Temperature | °C. | 80 | 80 | 80 | 80 | 80 |
| Polymer obtained |  |  |  |  |  |  |
| Quantity | g. | 6.6 | 70 | 29 | 257 | 100 |
| Catalytic activity g.PE/h.g.Ti.atm.$C_2H_4$ |  | 1170 | 1730 | 8550 | 1030 | 206 |
| Melt index according to ASTM D 1238-59 T norm |  | 1.3 | 0. | 1.7 | 0 | — |

EXAMPLES 9 TO 11

With the same solid catalysts and according to the mode of operation of Example 1, there were carried out polymerization tests with various activators. The exact nature of these activators and the results obtained therewith are given in Table 3.

|  |  |  |  | Polymerization Conditions | | Results | |
|---|---|---|---|---|---|---|---|
| Test No. | Solid catalyst used mg. | Activator used Nature | Quantity mg. | Partial pressure $C_2H_4$ kg./cm.$^2$ | Partial pressure $H_2$ kg./cm.$^2$ | Weight of polyethylene g. | Catalytic Activity g.PE/g.Ti. h.atm.$C_2H_4$ |
| 9 | 397 | $Al(Et)_2Cl$ | 200 | 2 | 4 | 60 | 6560 |
| 10 | 357 | $Zn(C_2H_5)_2$ | 198 | 2 | 4 | 1 | 127 |
| 11 | 322 | $Sn(nBu)_3H$ | 1000 | 20 | — | 0.2* | 2* |

*Duration of test: 4 h.

EXAMPLE 12

A test for the copolymerization of ethylene and propylene was carried out in suspension in the liquid monomers in the presence of the solid product prepared according to Example 1.

241 mg. of this product are introduced into a 1.5 liter autoclave with 50 mg. of $Al(iC_4H_9)_3$ as a solution comprising 100 g./l. in hexane. The autoclave is cooled down to −20°C. and 336 g. or 8 moles of pure dry propylene are condensed therein. The content is then heated up to 40°C. and ethylene is introduced in such a way that the molar ratio $C_3H_6/C_3H_6 + C_2H_4$ in the liquid phase is 0.925.

After 30 minutes, the unreacted monomers are vented and 344 g. of a rubbery copolymer of ethylene and propylene are isolated.

amount of propylene in the product is remarkably high, especially in view of the composition of the mixtures of monomers.

EXAMPLE 13

With the solid catalyst of which the preparation has been described in Example 1, there is carried out a test for the polymerization of propylene.

In a 1.5 liter stainless steel autoclave there are introduced 1.464 g. of the solid catalyst, and 6.35 ml. of a solution containing 40 g./l. of $Al(C_2H_5)_2Cl$ in hexane. The mixture is cooled to −20°C. and 1 liter or 12 moles of propylene are condensed within the autoclave, the mixture is then stirred and heated to a temperature of 60°C. while introducing hydrogen under a partial pressure of 0.7 kg./cm.$^2$.

After 2 hours, the propylene which has not reacted is vented and there are collected 267 g. of polypropylene which corresponds to a catalytic activity of 24,700 g. PP/h.g.Ti. The intrinsic viscosity of the resulting polypropylene measured at 140°C. in tetralin, was 0.11 l./g. and its crystallinity, measured by differential thermal analysis, was 13.6% by weight.

What we claim and desire to secure by letters patent is:

1. Process for the polymerization and copolymerization of α-olefins which comprises carrying out said polymerization and copolymerization in the presence of a catalyst comprising an organometallic compound of a metal of Groups I, II, III and IV of the Periodic Table and the product obtained by reacting in the liquid phase a transition metal derivative selected from the group consisting of the halides, oxyhalides, alkoxyhalides, oxyalkoxides and alkoxides of the metals of Groups IVb, Vb, and VIb of the Periodic Table and an anhydrous solid support consisting of a hydroxide of the formula $M(OH)_2$ in which M is selected from the group consisting of magnesium, chromium, manganese, iron, nickel, cobalt, copper, zinc and cadmium, said transition metal derivative and said hydroxide being initially mixed under conditions which prevent overheating leading to solidification of the reaction mixture.

2. Process according to claim 1 in which said transition metal derivative which is reacted with said support is selected from the group consisting of titanium tetrachloride and, vanadium oxychloride, and in which the organometallic compound is a trialkyl aluminum or an alkylaluminum halide.

3. Process according to claim 1, in which the α-olefin is ethylene.

4. Process according to claim 1 in which ethylene and propylene are copolymerized.

5. Process according to claim 1, in which the reaction is carried out by circulating a cooled current of said transition metal derivative over said hydroxide at a speed such that no local overheating takes place, the suspension being then heated to from about 40° to 180°C.

6. Process according to claim 1, in which said hydroxide is mixed with said transition metal derivatives by allowing said hydroxide to fall in powder form into a large amount of cold transition metal derivatives, the suspension being then heated to from about 40° to 180°C.

7. A process for the polymerization of ethylene and mixtures thereof with other α-olefins copolymerizable therewith which comprises carrying out said polymerization and copolymerization in the presence of a catalyst comprising an organometallic compound of a metal of Groups I, II, III and IVA of the Periodic Table and the product obtained by reacting in the liquid phase a transition metal derivative selected from the group consisting of the halides, oxyhalides, alkoxyhalides, oxyalkoxides and alkoxides of the metals of Groups IVb, Vb and VIb of the Periodic Table and an anhydrous solid support consisting of $Mg(OH)_2$, said transition metal derivative and said $Mg(OH)_2$ being initially mixed under conditions which prevent overheating leading to solidification of the reaction mixture.

8. Process according to claim 7, in which the reaction is carried out by circulating a cooled current of said transition metal derivative over said hydroxide at a speed such that no local overheating takes place, the suspension being then heated to from about 40° to 180°C.

9. Process according to claim 7, in which said hydroxide is mixed with said transition metal derivatives by allowing said hydroxide to fall in powder form into a large amount of cold transition metal derivatives, the suspension being then heated to from about 40° to 180°C.

10. Process for the polymerization and copolymerization of α-olefins which comprises carrying out said polymerization and copolymerization in the presence of a catalyst comprising an organometallic compound of a metal of Groups I, II, III and IV of the Periodic Table and the product obtained by reacting in the liquid phase a transition metal derivative selected from the group consisting of the halides, oxyhalides, alkoxyhalides, oxyalkoxides and alkoxides, of the metals of Groups IVb, Vb, and VIb of the Periodic Table and an anhydrous solid support consisting of a hydroxide of the formula $M(OH)_2$ in which M is selected from the group consisting of magnesium, chromium, manganese, iron, nickel, cobalt, copper, zinc and cadmium, said transition metal derivative and said hydroxide being initially mixed under conditions which prevent overheating leading to solidification of the reaction mixture and then heating said mixture to a temperature of from about 40° to 180°C.

11. A process for the polymerization of ethylene and mixtures thereof with other α-olefins copolymerizable therewith which comprises carrying out said polymerization and copolymerization in the presence of a catalyst comprising an organometallic compound of a metal of Groups I, II, III and IVA of the Periodic Table and the product obtained by reacting in the liquid phase a transition metal derivative selected from the group consisting of the halides, oxyhalides, alkoxyhalides, oxyalkoxides and alkoxides of the metals of Groups IVb, Vb and VIb of the Periodic Table and an anhydrous solid support consisting of $Mg(OH)_2$, said transition metal derivative and said $Mg(OH)_2$ being initially mixed under conditions which avoid overheating leading to solidification of the reaction mixture and the mixture being then heated to a temperature of from 40° to 180°C.

12. Process for the polymerization of ethylene and for the copolymerization of ethylene and propylene which comprises carrying out said polymerization and copolymerization in the presence of a catalyst comprising an organometallic compound selected from the group consisting of trialkyl aluminums, and dialkylaluminumhalides and the product obtained by reacting in a liquid phase a transition metal derivative selected from the group consisting of titanium tetrachloride, titanium dichloride diethoxide, titanium tetrabutoxide, vanadium tetrachloride, vanadium oxychloride, vanadium oxytributoxide and chromium oxychloride with an anhydrous solid support consisting of magnesium hydroxide, said hydroxide being mixed with said transition metal derivative by allowing said hydroxide to fall in powder form into said transition metal derivative in liquid form under conditions which prevent overheating leading to solidification of the reaction mixture and then heating the reaction mixture to a temperature of from 40° to 180°C.

13. Process for the preparation of a catalytic complex which comprises reacting in the liquid phase a transition metal derivative selected from the group consisting of the halides, oxyhalides, alkoxyhalides, oxyalkoxides, and alkoxides of the metals of Groups IVb, Vb and VIb of the Periodic Table and an anhydrous solid support consisting of a hydroxide of the formula $M(OH)_2$ in which M is selected from the group consisting of magnesium, chromium, manganese, iron, nickel, cobalt, copper, zinc and cadmium, said transition metal derivative and said hydroxide being initially mixed under conditions which prevent overheating leading to solidification of the reaction mixture.

14. Process according to claim 13 in which the transition metal compound is selected from the group consisting of titanium tetrachloride and vanadium oxychloride.

15. A catalytic complex prepared according to claim 13.

16. A catalyst obtained by activating the catalytic complex prepared according to claim 13 with an organometallic compound of a metal of Groups I, II, III of the Periodic Table.

17. Process according to claim 13, in which the reaction is carried out by circulating a cooled current of said transition metal derivative over said hydroxide at a speed such that no local overheating takes place, the suspension being then heated to from about 40° to 180°C.

18. Process according to claim 13, in which said hydroxide is mixed with said transition metal derivatives by allowing said hydroxide to fall in powder form into a large amount of cold transition metal derivatives, the suspension being then heated to from about 40° to 180°C.

19. Process for the preparation of a catalytic complex which comprises reacting in the liquid phase a transition metal derivatives selected from the group consisting of the halides, oxyhalides, alkoxyhalides, oxyalkoxides, and alkoxides of the metals of Groups IVb, Vb and VIb of the Periodic Table and an anhydrous solid support consisting of a hydroxide of the formula $M(OH)_2$ in which M is selected from the group consisting of magnesium, chromium, manganese, iron, nickel, cobalt, copper, zinc and cadmium, said transition metal derivative and said hydroxide being initially mixed under conditions which avoid overheating leading to solidification of the reaction mixture and the mixture then being heated to a temperature of from about 40° to 180°C.

* * * * *

UNITED STATES PATENT AND TRADEMARK OFFICE
CERTIFICATE OF CORRECTION

PATENT NO. : 3,883,492
DATED : May 13, 1975
INVENTOR(S) : Andre Delbouille & Jean-Louis Derroitte It is certified that error appears in the above-identified patent and that said Letters Patent are hereby corrected as shown below:

Column 2, line 6, the comma should be a period and the immediately succeeding word should start a new sentence.

Column 4, line 30, "as" should read --a--.

Column 5, line 11, "catalyst" should read --catalysts--.

Signed and Sealed this eighteenth Day of November 1975

[SEAL]

Attest:

RUTH C. MASON
Attesting Officer

C. MARSHALL DANN
Commissioner of Patents and Trademarks